United States Patent
Kassmann (10) Patent No.: US 6,657,742 B1
(45) Date of Patent: Dec. 2, 2003

(54) SYSTEM FOR PRINTING FACSIMILE JOBS WITH A PROPERTY PROFILE

(75) Inventor: Gary W. Kassmann, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 854 days.

(21) Appl. No.: 08/977,193

(22) Filed: Nov. 24, 1997

(51) Int. Cl.[7] .............................................. G06K 15/00
(52) U.S. Cl. ........................ 358/1.15; 358/500; 358/400
(58) Field of Search .............................. 395/114, 111, 395/109; 358/1.11–1.18, 1.1–1.9, 500, 400

(56) References Cited

U.S. PATENT DOCUMENTS

| | | | | |
|---|---|---|---|---|
| 4,914,455 A | * | 4/1990 | Hayes .......................... | 347/131 |
| 4,970,554 A | | 11/1990 | Rourke ........................ | 355/202 |
| 5,467,434 A | | 11/1995 | Hower, Jr. et al. .......... | 395/114 |
| 5,600,762 A | | 2/1997 | Salgado et al. .............. | 395/114 |
| 5,619,649 A | | 4/1997 | Kovnat et al. .......... | 395/200.01 |
| 5,644,685 A | * | 7/1997 | Baehr .......................... | 395/111 |
| 5,657,461 A | | 8/1997 | Harkins et al. .............. | 305/333 |
| 5,689,625 A | * | 11/1997 | Austin et al. ................ | 395/114 |
| 5,781,711 A | * | 7/1998 | Austin et al. ................ | 395/114 |
| 5,828,466 A | * | 10/1998 | Imai et al. ................... | 358/404 |
| 5,854,693 A | * | 12/1998 | Youshiura et al. ........... | 395/114 |
| 5,872,899 A | * | 2/1999 | Komatsu et al. ............ | 395/109 |

* cited by examiner

Primary Examiner—Gabriel Garcia
Assistant Examiner—King T. Poon
(74) Attorney, Agent, or Firm—Gary Cohen; Richard F. Spooner (57) ABSTRACT

There is disclosed a printing system, with a memory, and a plurality of document processing related subsystems The printing system, which is adapted to receive a facsimile document via a network, includes a facsimile user profile stored in a memory of the printing system. The facsimile user profile includes one or more attribute sets with each attribute set, along with a corresponding set of attribute values, defining a manner in which a portion of the facsimile document is to be processed at a printing subsystem. The printing system further includes a facsimile processing subsystem for reading the facsimile user profile to determine whether a selected one of the plurality of document processing related subsystems is enabled to process the portion of the facsimile document in accordance with one of the one or more attribute sets if the facsimile user profile. In practice, the portion of the facsimile document is processed with the selected one of the plurality of document processing related subsystems when it is determined, with the facsimile processing subsystem, that the selected one of the plurality of document processing related subsystems is enabled to process the portion of the facsimile document in accordance with the facsimile user profile.

2 Claims, 9 Drawing Sheets

SYSTEM FOR PRINTING FACSIMILE JOBS WITH A PROPERTY PROFILE

BACKGROUND AND MATERIAL DISCLOSURE STATEMENT

This invention relates generally to a network capable, multifunctional printing system and more particularly to an improvement for a printing system in which a facsimile document or job is transmitted to a destination printing subsystem, from a facsimile input device with minimal programming capability, for use with a facsimile user profile, the facsimile user profile communicating with the destination printing subsystem and providing the facsimile document with an expanded range of programmability when the facsimile document is processed in conjunction with the facsimile user profile.

Electronic printing systems typically include an input section, a controller, and an output section or print engine. It is particularly significant that an electronic printing system can be adapted to receive jobs for processing by way of a "front end" or "server" communicatively coupled with a local area or wide area network. An example of such electronic printing system is the Xerox DocuCentre 35 ("DocuCentre" is a trademark of Xerox Corporation) which communicates with a remote network client by way of network printing software referred to as Centreware ("Centreware" is a trademark of Xerox Corporation). In one example of network printing, a job, including image data and control or programming instructions, is prepared at the client and compiled, by way of a suitable print driver, for transmission across the network to the electronic printing system. The job is interpreted or decomposed with the front end of the electronic printing system for marking with the corresponding print engine. Further detailed description of the network printing process is provided in U.S. Pat. No. 5,493,634 to Bonk et al. (Issued: Feb. 20, 1996), the disclosure of which is incorporated herein by reference.

In one area related to electronic printing, namely digital copying, a demand for "multifunctionality" continues to grow. As illustrated by U.S. Pat. No. 3,957,071 to Jones (Issued Jul. 27, 1971), a multifunctional digital copier can assume the form of an arrangement in which a single electrostatic processing printer is coupled with a plurality of different image input devices, with such devices being adapted to produce image related information for use by the printer. Additionally, U.S. Pat. No. 4,821,107 to Naito et al. (Issued: Apr. 11, 1989) discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

As mentioned above, in preparing a job for transmission, the client provides the job with a set of control of programming instructions which indicates a manner in which a destination printer or copier is to process the image data of the job. Additionally, the programming instructions provide guidance as to the manner in which a document, corresponding with the image data, is to be processed. For instance, the programming instructions invariably include information regarding the print media upon which the document is to be printed and may include information indicating how one or more prints are to be finished. Typically, as disclosed by U.S. Pat. No. 5,467,434 to Hower, Jr. et al. (Issued: Nov. 14, 1995), the disclosure of which is incorporated herein by reference, programming instructions are provided in the form of print characteristics or attributes (e.g. print media to be used for marking is characterized by the attributes "media size", "media color", "media type" and "media weight") where each attribute is corresponded with a value (e.g. print size=8.5×11.0).

Programming of a job is often achieved with a "job ticket". For many printing systems, the job ticket is provided in the form of one or more programmable dialogs, each programmable dialog including values which are selected with a user interface, such as the user interface found in a DocuTech printing system ("DocuTech" is a registered trademark of Xerox Corporation). Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values.

With respect to a multifunctional printing system, a job can be viewed as "composite" in nature since it may include a plurality of "job segments". Each job segment, as defined by U.S. Pat. No. 5,00,762 to Salgado et al. (Issued: Feb. 4, 1997), the disclosure of which is incorporated herein by reference, includes a pair of input/output designations used to describe the processing of the job. For example, one job segment may comprise a fax segment in which image data is provided at the scanner of a multifunctional copier for printing at the marking engine of a facsimile device, and another job segment may comprise a print job in which the image data is provided at the scanner of the multifunctional copier for printing at a printer on the network disposed remotely of the multifunctional copier.

Communication of programmed segments on a network can be facilitated through the teachings of U.S. Pat. No. 5,657,461 to Harkins et al. (Issued: Aug. 12, 1997). The '461 Patent discloses a method in which a sender automatically distributes information to a receiver on a network using devices (such as printers and facsimile machines) and communication channels (such as electronic mail) defined in a receiver profile. The receiver profile establishes the properties and mode for receipt of information for receivers on the network and the profile is published in a network repository for all network users or is accessible by selected groups or individuals on the network. As disclosed in the '461 Patent, the properties of the profile relate to a manner in which a job is to be communicated throughout the network relative to various user locations rather than control instructions for the job.

Neither U.S. Pat. No. 5,00,762 or U.S. Pat. No. 5,657,461 address a situation in which a user of a typical or common facsimile device desires to transmit a fax segment from a facsimile device to a multifunctional copier where the copier includes many programmable attributes (e.g. image processing, print media and finishing attributes) which are not made available at the typical facsimile device. For instance, the facsimile device may, through use of a suitable protocol, such as ITU-T T.30 protocol, provide the fax segment with a paper size attribute (e.g. substrate width); however, a host of other attributes, including a number of media related attributes, are not provided at the facsimile device. In particular, a typical facsimile device does not permit the user to provide a variety of image processing attributes (e.g. auto-sizing), print media attributes (e.g. print media color and print media type) and finishing (e.g. stitching or binding). Thus the user of a facsimile device is often put in a position of being unable to utilize the full functionality of the destination multifunctional copier.

The programming capability of a typical facsimile device can be enhanced by the use of a subsystem in which optical character recognition is used in conjunction with a coded sheet. In one such approach, a paper job ticket with programming selections and accompanying selection areas is provided to a user. Prior to scanning a hard copy document, the user marks the appropriate selection areas and scans the coded sheet with the OCR subsystem. Accordingly, the programming selections of the coded sheet are passed along with the image data of a job for use in job processing at a destination printing device.

As will be recognized by those skilled in the art, a system employing machine readable code, such as that disclosed by U.S. Pat. No. 4,970,554 to Rourke (Issued: Nov. 13, 1990) could be used to enhance the programmability of a network printing system. In the '554 Patent, programming instructions are stored at a network location and those instructions are accessed by a destination printing machine upon reading a bar code written on a separator sheet. An approach related to that disclosed by the '554 Patent can be found in U.S. Pat. No. 5,619,649 to Kovnat et al. (Issued: Apr. 8, 1997).

Xerox Corporation markets a product, referred to as "PaperWorks" ("PaperWorks" is a trademark of Xerox), which uses concepts similar to those used in the above-described OCR/coded sheet system. In particular, the PaperWorks product utilizes a special encoded fine pattern of special marks ("glyphs"), electronically recognized as such using PC computer software by a facsimile electronic image receiver. The PaperWorks product was configured initially to operate on a conventional personal computer having a conventional internal fax card and a modem, electronic mail system or other network connection to telecommunications, and running "Windows" software ("Windows" is a trademark of Microsoft, Inc.). A "PaperWorks" fax form carries a coded identification region which, upon scanning, may be decoded by an appropriate processing system. This coded identification allows the system to determine which of several different pre-stored forms the received form is, and what its page layout is. From this, the system can also extract the necessary user-entered information from the form to facilitate processing. An important feature of the PaperWorks system is the use of data defining a control sheet image to provide information in accordance with which operations are performed on data defining a sequence of images (data defining images, not actual physical sheets of a medium). For example, the control sheet image can include information indicating a destination to which a fax server then transmits data defining the sequence of images.

The use of coded sheets to provide a fax document with a higher degree of programming is well suited for those situations in which a facsimile device user is provided with an appropriate level of resources, such a suitable sheet and the software necessary to interpret the sheet. Typically, however, users are not provided with such resources when transmitting a facsimile document from a common facsimile device to a destination printing machine. Moreover, when a print media tray is selected for use at a destination multi-functional copier with a plurality of print media trays on the basis of size alone, the possibility of choosing a tray loaded with print media having inappropriate color, type and/or weight is significant. It would be desirable to provide users with the ability to program the facsimile document transmitted from the common facsimile device with a robust set of attribute values without requiring such users to employ software other than the software normally employed with the common facsimile device.

The present invention is particularly suited for use in a network environment, such as in the context of the world wide web, the internet or the like. Examples of some recent patents relating to network environments of plural remote terminal shared users of networked printers include Xerox Corporation U.S. Pat. Nos. 5,483,653, 5,243,518, 5,226,112, 5,170,340 and 5,287,194. Some patents on this subject by others include U.S. Pat. Nos. 5,113,355, 5,113,494 (originally filed Feb. 27, 1987), U.S. Pat. Nos. 5,181,162, 5,220,674, 5,247,670; 4,953,080 and 4,821,107. Further by way of background, some of the following Xerox® Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" © 1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . ."; "Xerox System Integration Standard Printing Protocol XSIS 118404", April 1984; "Xerox Integrated Production Publishers Solutions: "Booklet No. "610P50807" "11/85"; "Printing Protocol-Xerox System Integration Standard" © 1990 by Xerox Corporation, XNSS 119005 May 1990; "Xerox Network Systems Architecture", "General Information Manual", XNSG 068504 April 1985, with an extensive annotated bibliography, © 1985 by Xerox Corporation; "Interpress: The Source Book", Simon & Schuster, Inc., New York, N.Y., 1988, by Harrington, S. J. and Buckley, R. R.; Adobe Systems Incorporated "PostScript" Language Reference Manual", Addison-Wesley Co., 1990; "Mastering Novell" Netware®", 1990, SYBEX, Inc., Alameda, Calif., by Cheryl E. Currid and Craig A. Gillett; "Palladium Print System" © MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "Lion Heart®" systems, first announced Sep. 13, 1990, are also noted.

Current popular commercial published "systems software" with LAN workstation connections include Novell DOS 7.0, "Windows®" NT 3.1, and IBM OS/2 Version 2.1.

All of the references designated in the above Background section are incorporated herein by reference.

SUMMARY OF THE INVENTION

In accordance with one aspect of the present invention, there is disclosed a printing system, with a memory and a plurality of document processing related subsystems, for processing a facsimile document with an image data set. The printing system, which communicates with an input device, by way of a network, so that one or more prints are producible from the image data set when the image data set is transmitted from the input device to a printing subsystem. The printing system includes: a facsimile user profile, stored in the memory of the printing system, including one or more attribute sets with each attribute set, along with a corresponding set of attribute values, defining a manner in which a portion of the facsimile document is to be processed at the printing subsystem; a facsimile processing subsystem for reading the facsimile user profile to determine whether a selected one of the plurality of document processing related subsystems is enabled to process the portion of the facsimile document in accordance with one of the one or more attribute sets if the facsimile user profile; and wherein the portion of the facsimile document is processed with the selected one of the plurality of document processing related subsystems when it is determined, with said facsimile processing subsystem, that the selected one of the plurality of document processing related subsystems is enabled to process the portion of the facsimile document in accordance with the facsimile user profile.

In accordance with another aspect of the present invention, there is disclosed a method of processing a facsimile document in a network printing system having a printing subsystem communicating with an input device by way of a network. The network printing system includes a memory and a plurality of document processing related subsystems, the input device transmitting the facsimile document to a printing subsystem for producing one or more prints based on the facsimile document. The method includes: a) determining whether a facsimile user profile, including one or more attribute sets with each attribute set, along with a corresponding set of attribute values, defining a manner in which a portion of the facsimile document is to be processed at the printing subsystem, is stored in the memory; b) in response to determining that the facsimile user profile is stored in the memory, i) reading the facsimile user profile to determine whether a selected one of the plurality of document processing related subsystems is enabled to process the portion of the facsimile document in accordance with one of the one or more attribute sets if the facsimile user profile, and ii) processing the portion of the facsimile document with the selected one of the plurality of document processing related subsystems when it is determined with said (b)(i) that the selected one of the plurality of document processing related subsystems is enabled to process the portion of the facsimile document in accordance with the facsimile user profile; and c) in response to determining that the facsimile user profile is not stored in the memory, selecting one or more of the plurality of document processing related subsystems to process the portion of the facsimile document.

DESCRIPTION OF ONE OR MORE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
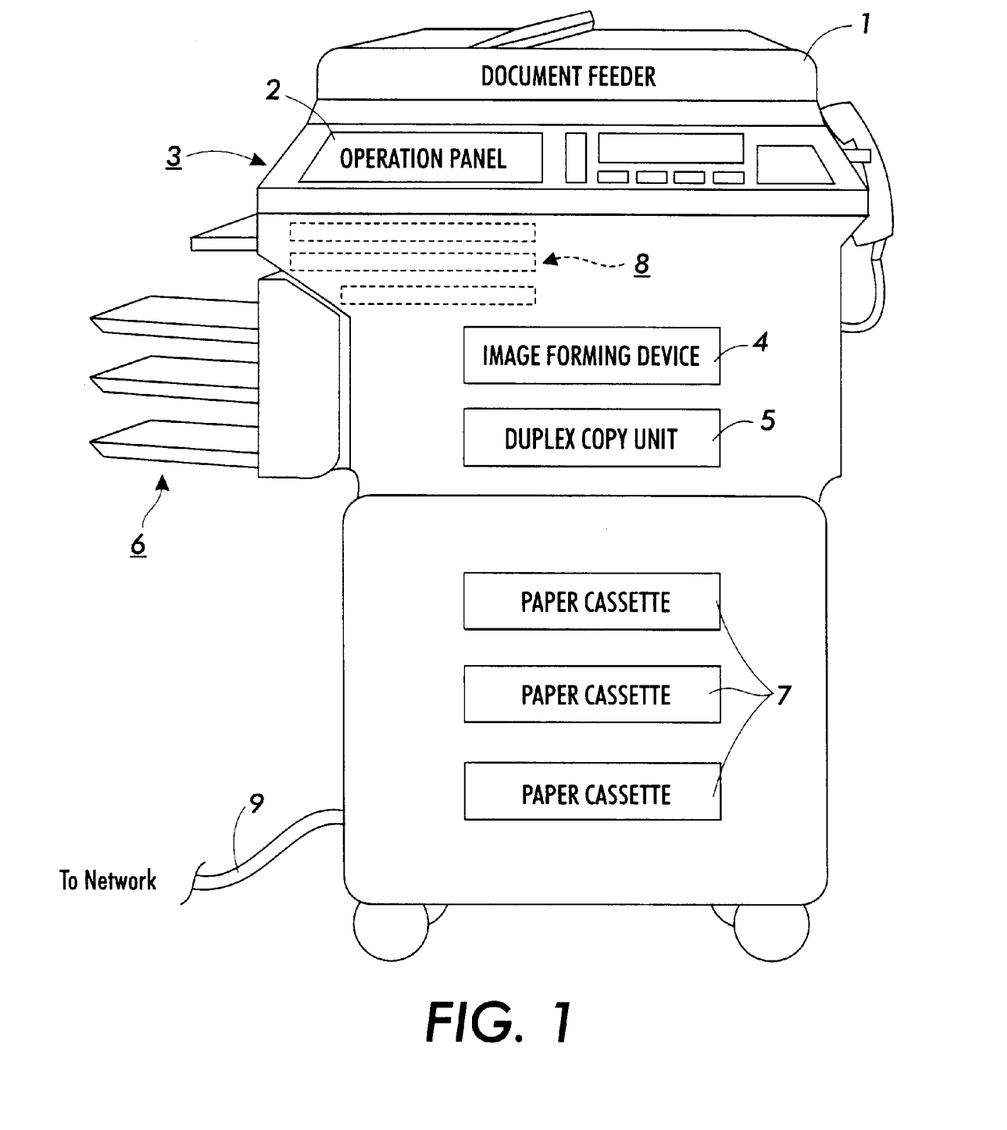
FIG. 1 is a perspective view of a networked digital copier suitable for receiving a job developed in accordance with the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Applications, generally 8, share the document feeder 1, operation panel 2, image reading device 3, image forming device 4, duplex unit 5, sorter 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
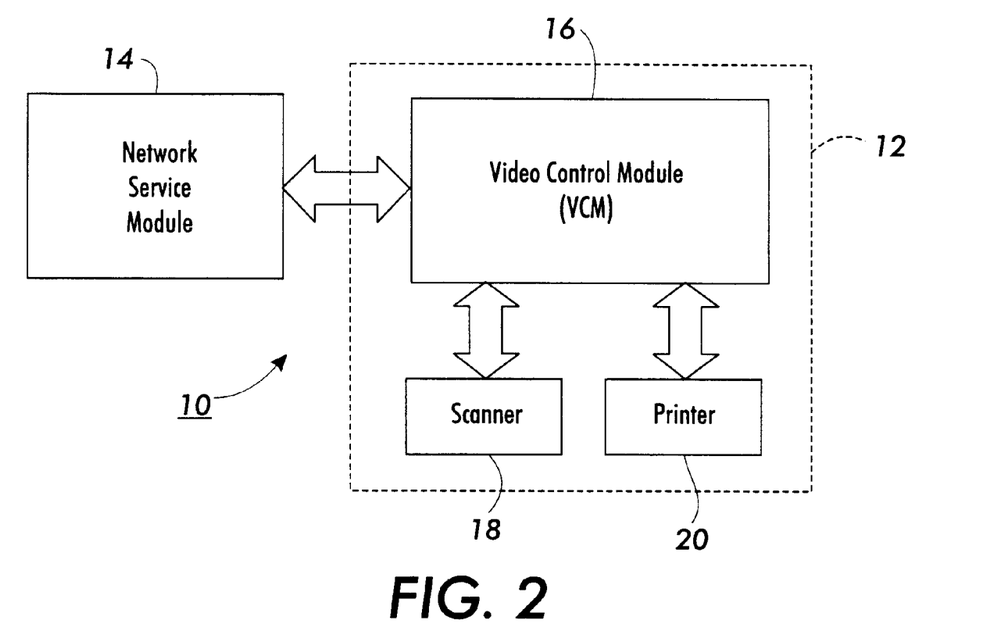
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
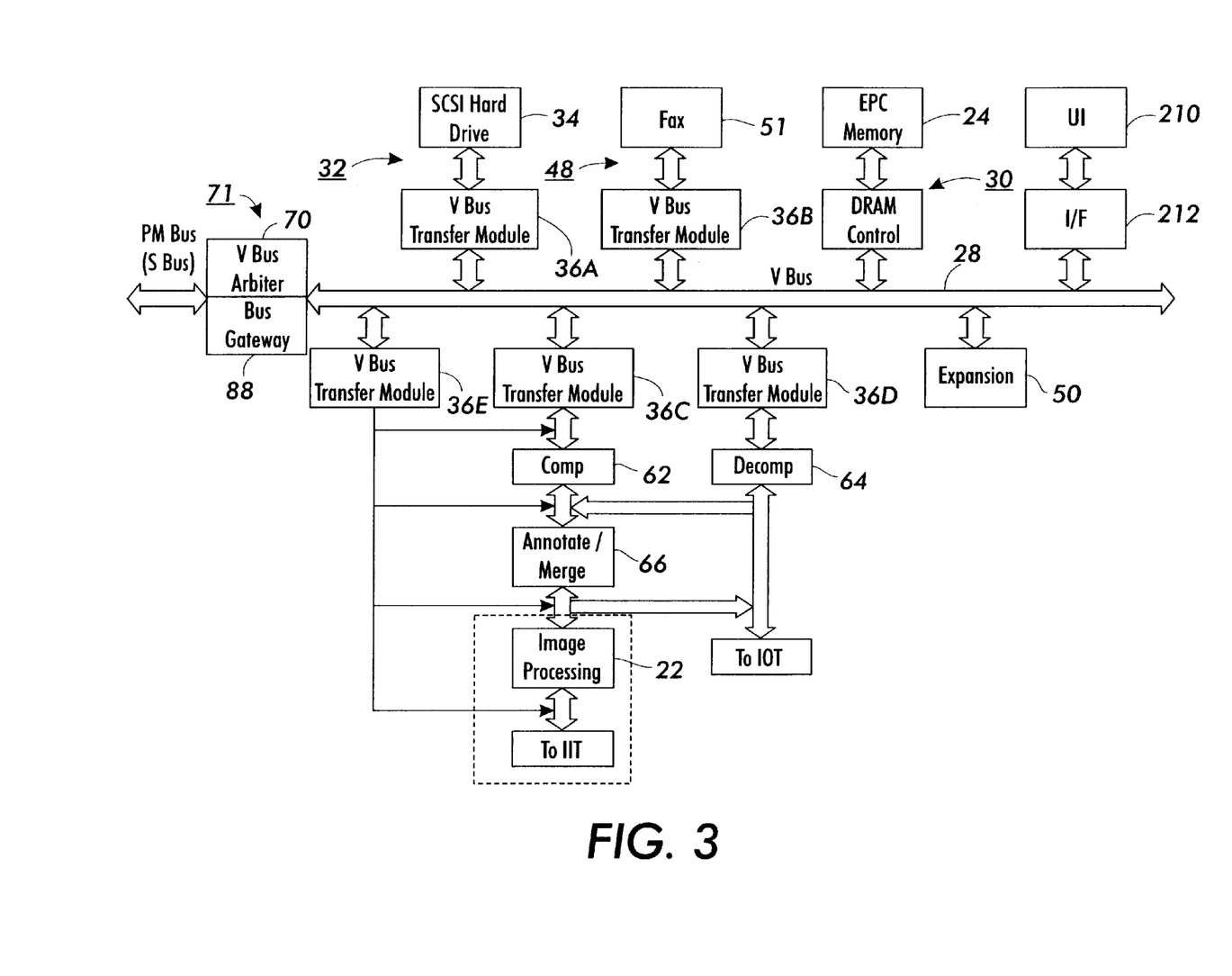
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 4:
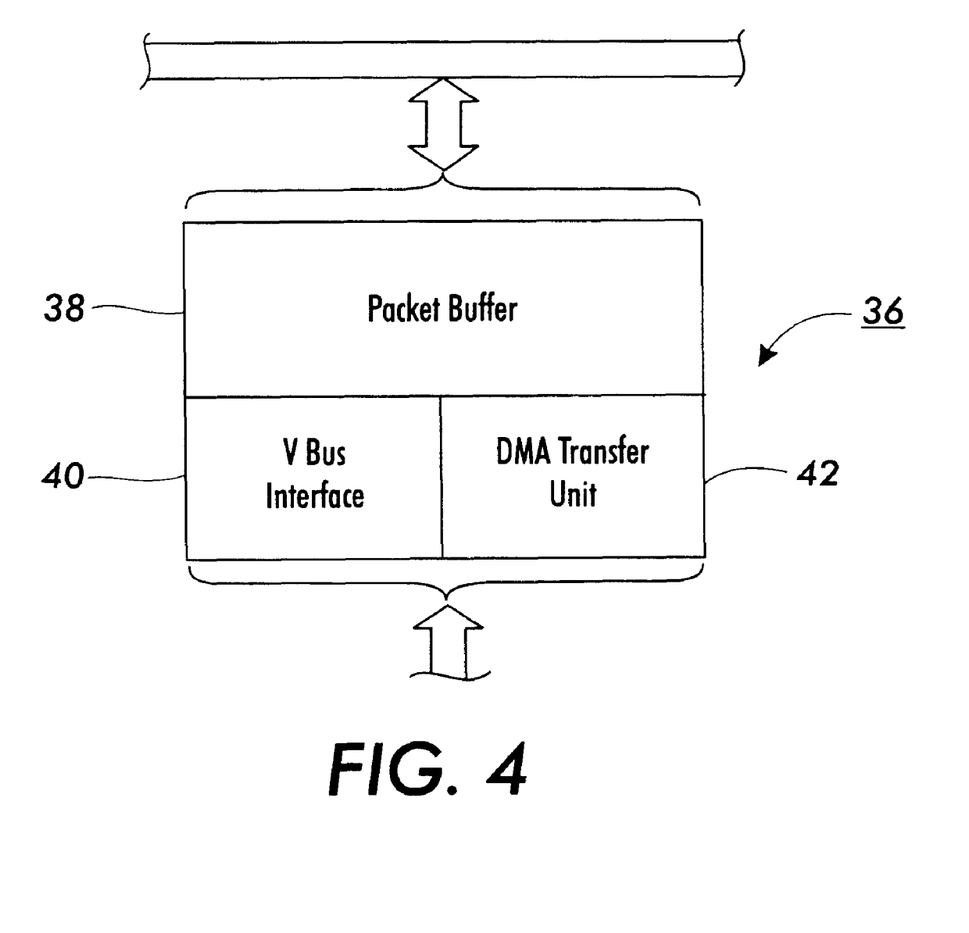
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42 . The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
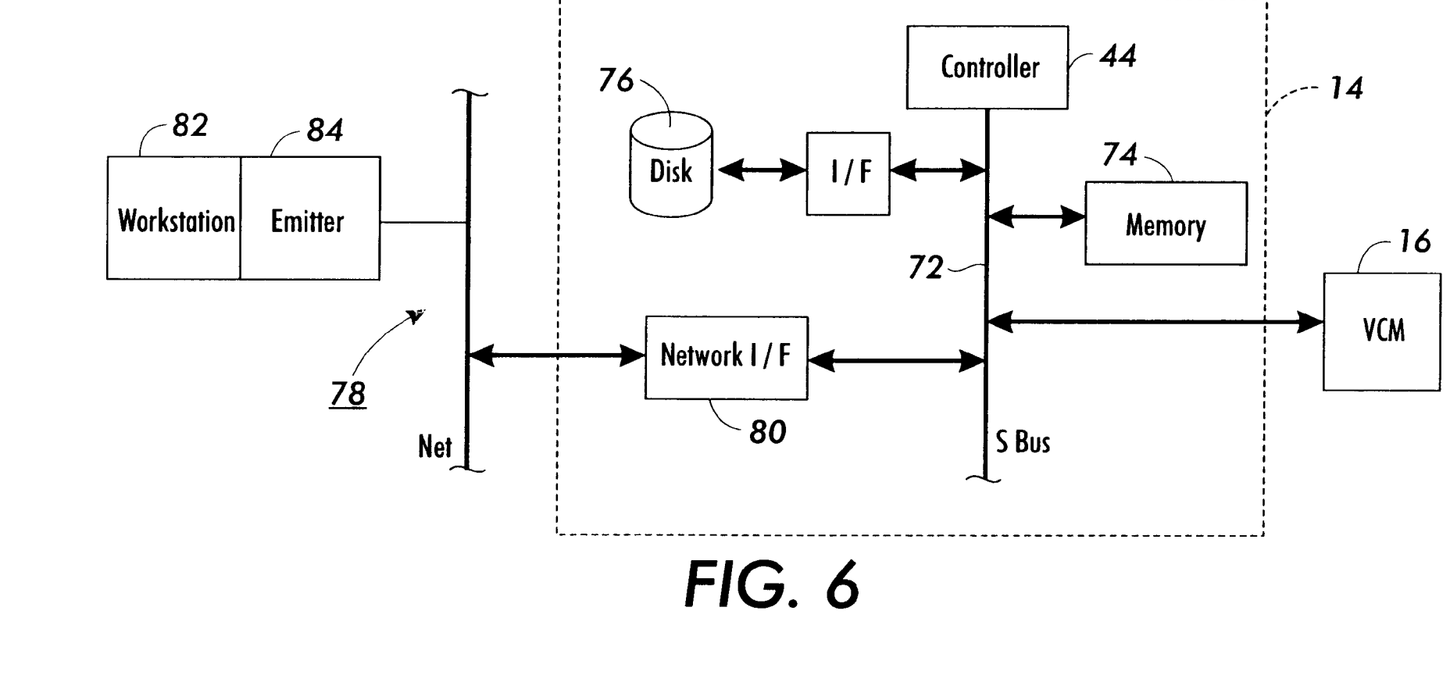
FIG. 6 is a block diagram of a network controller for the printing machine of FIG. 2.

Adjustment of the packet size is achieved with the VBus interface 40 and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

The DMA transfer unit employs a conventional DMA transfer strategy to transfer the packets, and the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
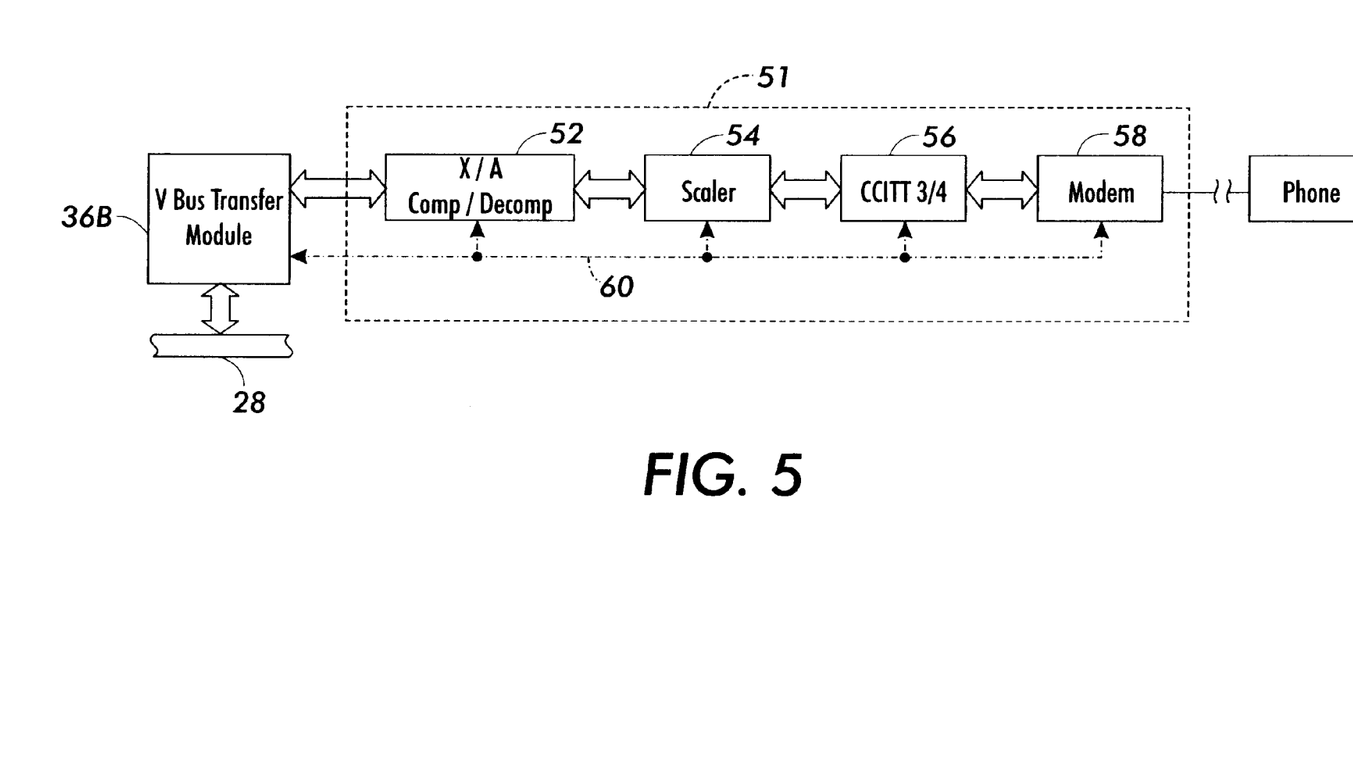
FIG. 5 is a block diagram of a facsimile card used in conjunction with the printing machine of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from ITU-T format, and a modem 58, preferably manufactured by Rockwell Corporation, for transmitting ITU-T formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
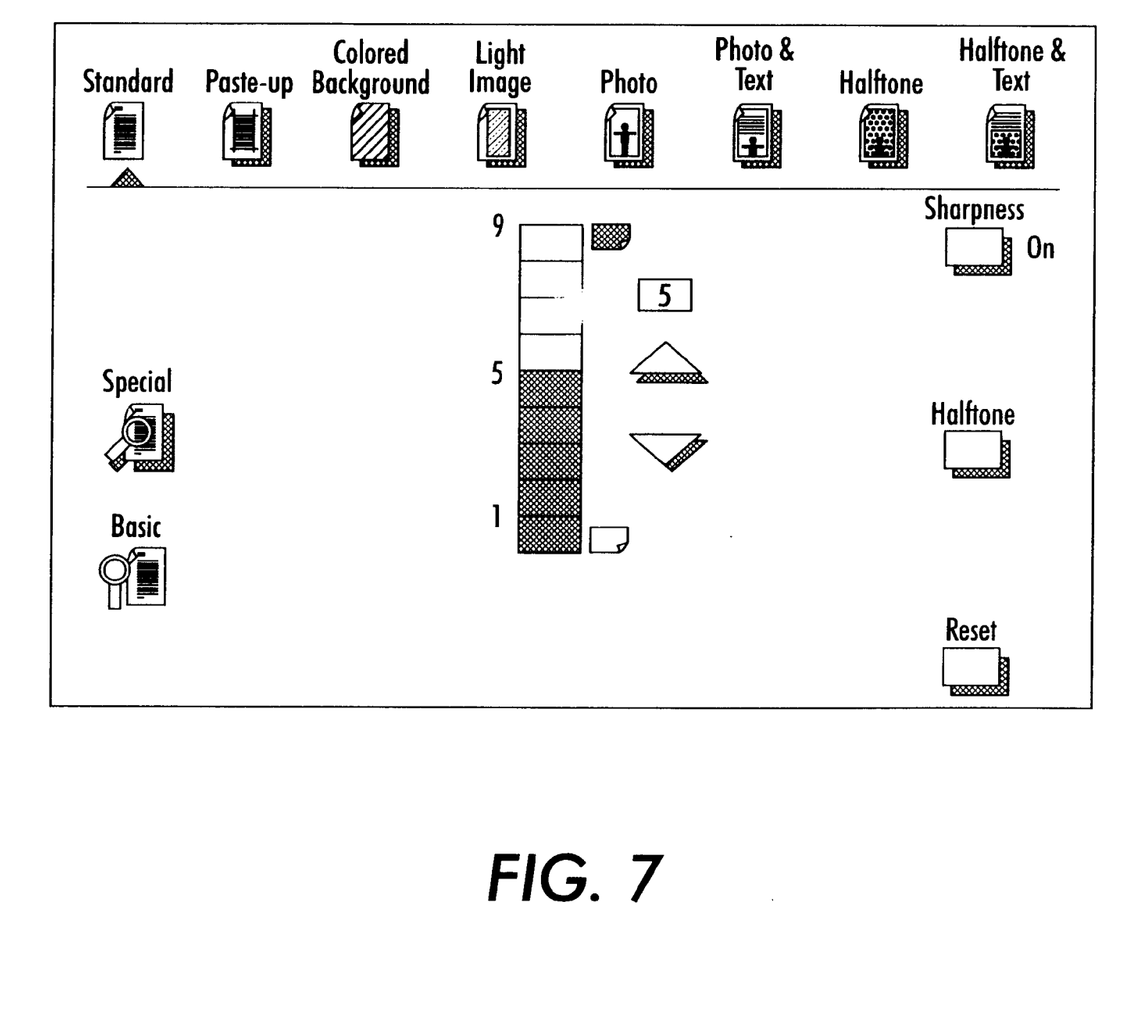
FIG. 7 comprises a flow diagram demonstrating an approach in which a facsimile document is processed in accordance with a technique embodying the present invention.

Referring now to FIG. 7, a technique for using one of several facsimile user profiles to both enhance the programmability of a common facsimile device and to insure that facsimile documents are processed with optimum resources at the printing system 10 is provided. In the illustrated embodiment of FIG. 7, a document is, at step 100, provided to the VCM 16 (FIGS. 2 and 3) for processing. As will be recognized, the document can be either local, i.e. developed at the scanner 18 as a copy job, or remote, i.e. received at either the network service module 14 as a print job or FAX 51 as a fax job. At step 102, the document to be processed is examined for determining whether it is a fax job. Assuming that the document is a job other than a fax job, then a normal marking process is executed at step 104. As will be understood, control instructions for the normal process are obtained with a suitable user interface ("UI") 210 (FIG. 3) (for copy jobs) or an interpretation process performed with the controller 44 (FIG. 6) of the network service module 14.

Assuming that the job to be processed is a fax job, then the controller 44 (or any suitable process associated therewith) determines, at step 108, whether a Fax User Profile ("FUP") resides in the memory 74. A FUP can be stored in the memory 74 by way of either the network (from, for example, the workstation 82) or the UI 210. In another example, the FUP could be obtained from a server in a manner similar to that disclosed in U.S. Pat. No. 5,619,649.

Figure 8:
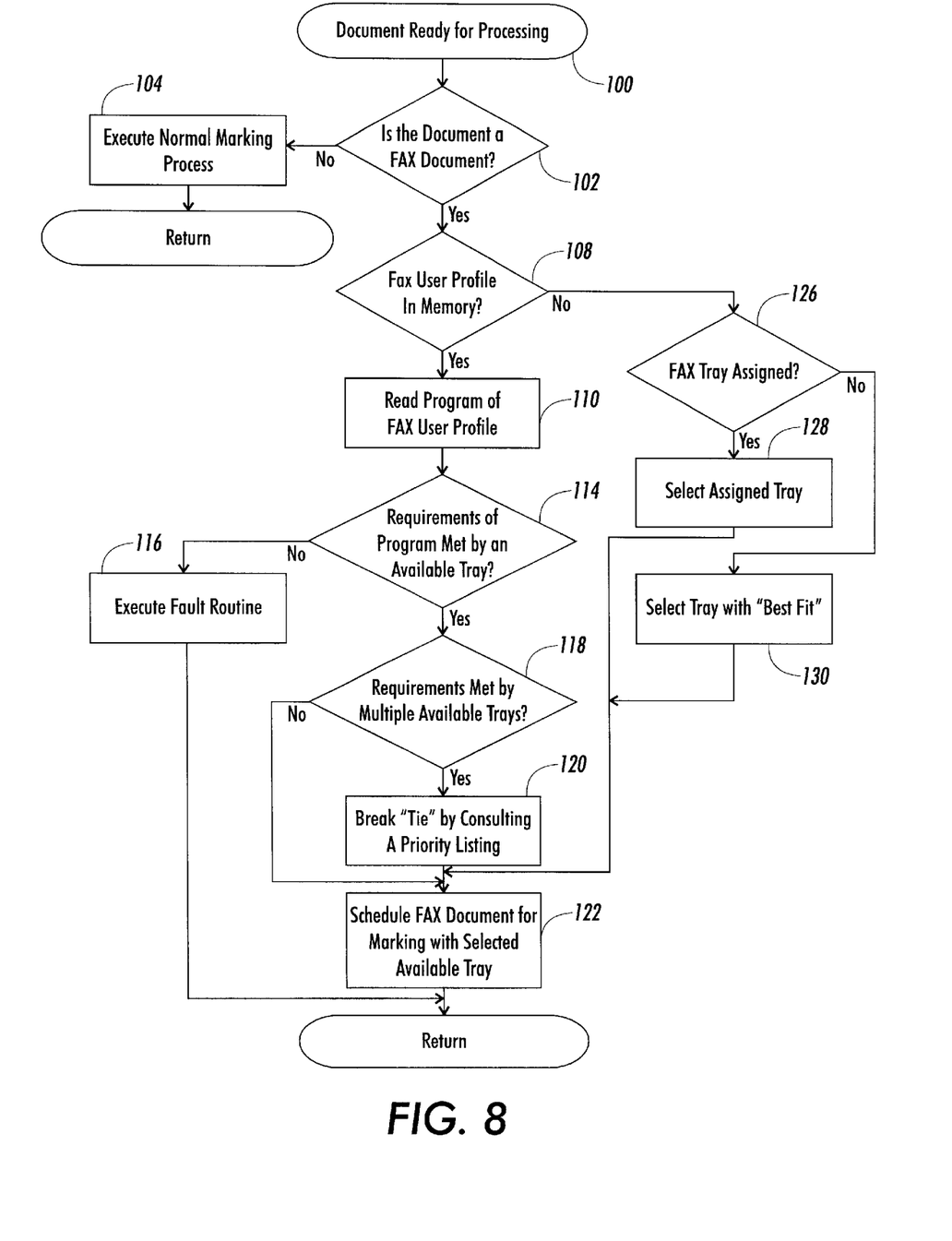
FIG. 8 is a elevational view of a dialog screen in which a facsimile user profile adapted to provide an advanced level of print media programming for a typical facsimile document is provided.
Figure 9:
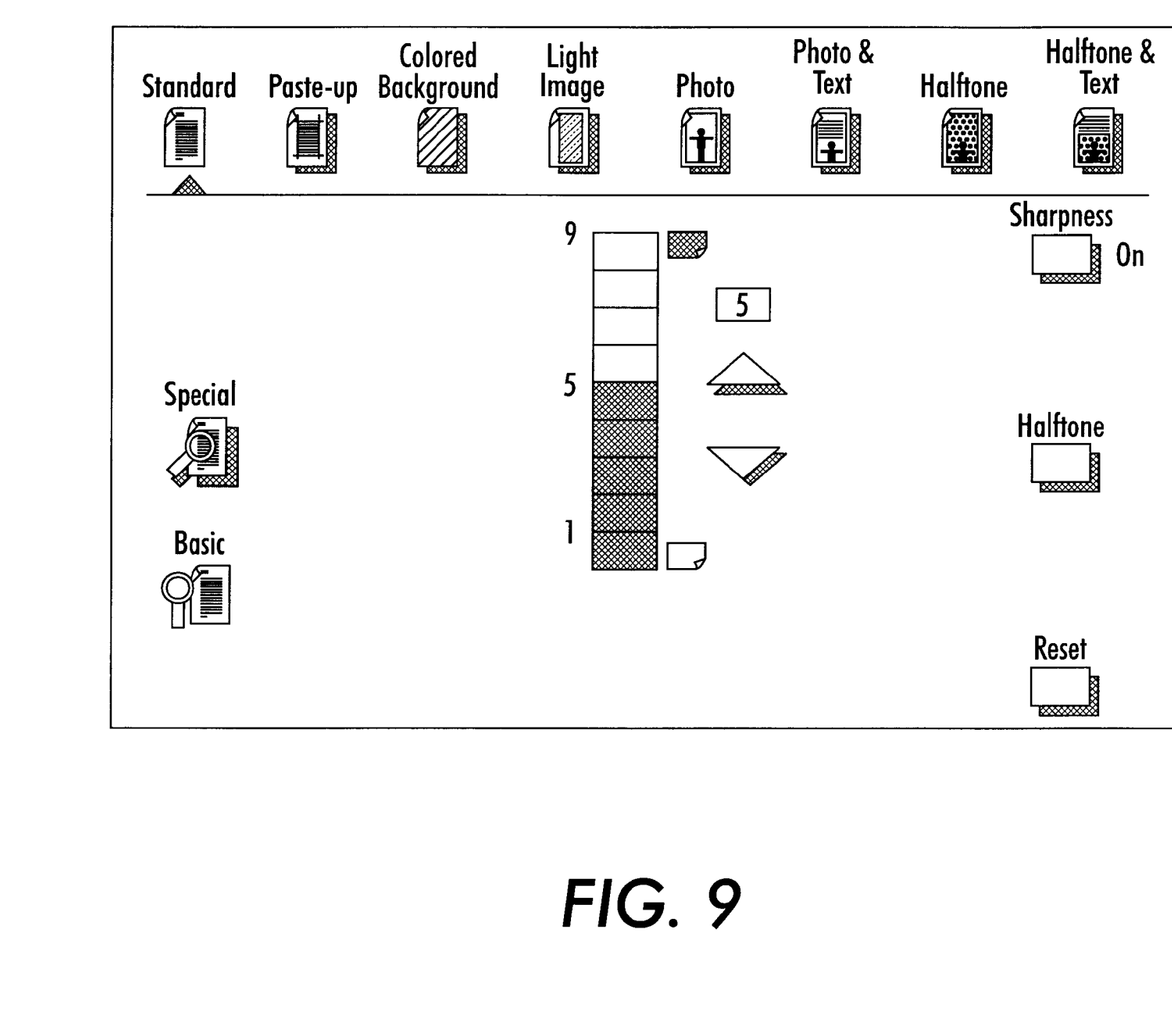
FIG. 9 is a elevational view of a dialog screen in which a facsimile user profile adapted to provide an advanced level of image processing programming for a typical facsimile document is provided.

As contemplated by the most preferred embodiment, the FUP includes three or more menus, two of which are shown in FIGS. 8 and 9. Essentially, each respective dialog of FIGS. 8 and 9 serves to define the overall character of the FUP. That is, the FUP is a composite of subprograms which provide many of the control instructions (i.e. attribute values) which cannot be conveyed by a typical facsimile device from which the fax job may originate. As will appear, the FUP can include any dialog or attribute value menu which would serve to enhance the processing of the facsimile document. Referring first to FIG. 8, stock or print media selections, including print media size, print media color and print media type are defined by the first dialog. While the dialog of FIG. 8 is shown as offering a limited amount of print media types and no indication of print media weight is shown, the dialog could be readily configured to provide the wide range of selections suggested by the print media selection dialog of U.S. Pat. No. 5,467,434. Additionally, the dialog of FIG. 8 includes programmable buttons, but in other examples any suitable cursor based system would be suitable for selection of media type. Finally, the dialog of FIG. 8 could be configured so that alternative choices could be made. For example, it might be desirable to program size for 8.5×11.0 or A4 paper. In this event, the dialog would be configured to permit the touching of multiple buttons in any one category, such as size.

Referring to FIG. 9, a dialog which permits the additional programming of image quality is provided. It should be appreciated that the concept of image quality is used here in its broadest sense so that, as shown in the dialog of FIG. 9, an exemplary image quality program is directed toward both sharpness (a procedure typically associated with image processing) and halftoning (a procedure sometimes associated with image manipulation). While scaling procedures are not referenced in the dialog of FIG. 9, it will be recognized, in view of the present disclosure, that the FUP could be advantageously employed to obtain "auto-scaling" for selected pages of the fax job. Additionally, the dialog of FIG. 9 could be used to provide an advanced level of annotation for the facsimile document. For a list of attributes suitable for use in the menu of the dialog of FIG. 9, reference is made to Xerox' DocuTech Production Publisher (Model 135).

Various other menus are contemplated for use with the preferred embodiment. In one example, a finishing dialog of the type disclosed in U.S. Pat. No. 5,467,434 would allow for finishing operations, such as stitching (e.g. stapling) and binding, to be imposed on the facsimile document. Finishing options would not be limited to stitching or binding, however, since it might be advantageous, under certain circumstances, to perform signaturizing operations on the facsimile document. Moreover, it will be appreciated that the finishing dialog could be enhanced by providing a mailbox option so that facsimile jobs could be directed to secured mailboxes of the type disclosed by U.S. Pat. No. 5,645,396 to Romanowski (Issued: Jul. 8, 1997). In another example, a job control dialog of the type shown in the U.S. Pat. No. 5,450,571 would be provided for controlling the number of sets to be produced for the facsimile document.

Referring again to FIG. 7, it will appear that the illustrated embodiment is directed toward a technique in which the FUP is characterized by the selections made with the dialog of FIG. 8. Nonetheless, as contemplated herein, the technique of FIG. 7 could be used as a basis for writing source code which examines the viability of processing the facsimile job with, among other document processing related subsystems, an image processing/manipulation subsystem, a finishing subsystem and/or a job level control subsystem.

Assuming that the condition of step 108 is met, the selections made with the FUP are read at step 110. With the information gleaned from step 110 (which, in the most expansive embodiment includes attribute values for, among other things, print media, image processing, job level control and/or finishing), a comparison is made at step 114 to determine if the attribute values set by the profile correspond with attribute values set for one of the print media trays or cassettes 7 (FIG. 7). As will be appreciated by those skilled in the art, attribute values for the trays may be set in accordance with the technique of U.S. Pat. No. 5,081,595 to Moreno et al. (Issued: Jan. 14, 1992), the disclosure of which is incorporated herein by reference.

It should be understood that the profile need not be used to process the entire facsimile document. In one example, a developer of the facsimile document may wish to simply provide instructions for making one or more pages of the facsimile document "special". For example, the developer may desire to print the facsimile document on typically print media (e.g. 8.5×11.0, standard, white) with a colored cover page and/or colored separator pages. In the example, the developer may alternatively wish to use drilled paper, instead of standard paper, so that the document can be placed into a notebook. In any event, to provide programming for document portions the FUP would be reconfigured slightly, in accordance with the teachings of U.S. Pat. No. 5,206,735 to Gauronski et al. (Issued: Apr. 27, 1993), the disclosure of which is incorporated herein by reference.

If no tray is suitable for processing the facsimile document, then a fault routine is executed at step 116. Preferably, the routine includes holding the facsimile document in a queue (disposed, for example. in memory 74 of FIG. 6), for further input by an owner of the facsimile document. As contemplated the document is released for processing when the owner or printing system user either alters the FUP to correspond with one of the trays or provides a release signal which permits at least certain portions of the job to processed with one or more default attribute settings or values. A process for releasing the job is disclosed in U.S. Pat. No. 4,843,5712 Notermans et al. (Issued; Jun. 27, 1989), the disclosure of which is incorporated herein by reference.

Assuming at least one tray does meet the requirements of the FUP, then a check is performed at step 118 to determine if multiple trays meet the requirements of the FUP, i.e. to determine if a "tie" exists between more than one tray. For those situations where a tie exists, a prestored priority list is consulted (step 120) to determine which tray is preferred for use. In one example, the facsimile document may require typical paper (8.5×11.0, standard, white) and the multifunctional copier may include a high capacity paper feeder. Accordingly, the priority list would preferably resolve the tie in favor or using the high capacity feeder to fulfill the requirements of the facsimile document.

After performing step 118 and/or step 120, the facsimile document is scheduled, at step 122, for marking with one of the trays 7 (FIG. 1). In view of the discussion above, it should now appear that steps 108, 110, 114, 116, 118, 120 and 122 could serve as a basis for writing a program which permits the facsimile document to be processed with a composite FUP accommodating for print media, image processing, job level control and/or finishing attributes. For example, upon determining that a required image processing operation (e.g. auto-scaling) called for by the FUP is available at the multifunctional copier, the document (or a portion thereof) could be scheduled for transmission to the Image Processing section 22 (FIG. 3).

Referring still to FIG. 7, the preferred embodiment further contemplates bimodal operation which insures that a suitable print media tray will be used in processing a facsimile document. More particularly, at step 108, if an FUP does not exist then the process proceeds to step 126 for accessing a subroutine which optimizes tray selection. In some instances it may be desirable to relegate fax marking to a particular tray through use of step 128. That is, if a particular tray is known to always have typical paper, then it may be desirable to dedicate that tray for use with facsimile document marking. In other instances, it may be desirable, via step 130, to use an auto-selection program which optimizes tray selection via a "best fit" algorithm. An exemplary program suited for such selection is disclosed by U.S. Pat. No. 5,229,814 to Hube et al. (Issued: Jul. 20, 1993), the disclosure of which is incorporated herein by reference. As will be appreciated by those skilled in the art, the routine of steps 126, 128 and 130 could serve as a basis for automatically selecting other processing operations, such as image processing operations, for a given facsimile document.

Numerous features of the above-described embodiments will be appreciated by those skilled in the art:

First, a technique for optimizing the programmability of a facsimile document is provided. In particular, it is understood that an extensive job ticket cannot be provided at a typical facsimile device, for transmission with a facsimile document to a multifunctional printing machine, without use of special resources. Through the technique of the preferred embodiment a profile is optionally stored in memory for use by the multifunctional printing machine in determining a manner in which the facsimile document is to be processed. In this way, programming functionality is provided for the facsimile document in a way which could not normally be obtained when using a typical facsimile transmitting device.

Second, the technique includes multiple safeguards which insure that an improper document processing related subsystem of a multifunctional printing machine will not be used in processing the facsimile document. In one mode of operation, the facsimile user profile (FUP) is employed to insure that part or all of the facsimile document is processed in accordance with attribute values designated by the FUP. More particularly, the facsimile document will not be processed if requirements designated by the FUP do not correspond with requirements available at the multifunctional printing machine. Moreover, when the requirements designated by the FUP do not correspond with the requirements designated by the FUP, processing will not be permitted until an owner of the facsimile document provides the multifunctional printing machine with suitable release information, e.g. a release signal.

In another mode of operation, when a FUP is not provided, the multifunctional printing machine insures that the facsimile document is directed to an optimal document processing related subsystem, the optimal document processing related subsystem being either preassigned or selected "on the fly" with a "best fit" algorithm.

What is claimed is:

1. A method of printing a facsimile document, including an image data set, with a network printing system having a printing subsystem communicating with an input device by way of a network, the printing system including a memory and a plurality of document processing related subsystems, the input device transmitting the facsimile document to the printing system for producing one or more prints from the image data set, said method comprising; a) storing a facsimile user profile in the memory of the printing system, the facsimile user profile including one or more attribute sets with each attribute set, along with a corresponding set of attribute values, defining a manner in which a portion of the facsimile document is to be processed at the printing subsystem; b) reading the facsimile user profile to determine whether a selected one of the plurality of document processing related subsystems is enabled to process the portion of the facsimile document in accordance with one of the one or more attribute sets of the facsimile user profile; and c) processing the portion of the facsimile document with the selected one of the plurality of document processing related subsystems when it is determined with said (b) that the selected one of the plurality of document processing related subsystems is enabled to process the portion of the facsimile document in accordance with the facsimile user profile; in which the selected one of the plurality of document processing related subsystems include a first print media tray with print media characterized by a first set of print media attributes and a second print media tray with print media characterized by a second set of print media attributes, wherein: said (b) includes determining whether one or both of the first and second print media trays are enabled to process the portion of the facsimile document in accordance with the facsimile user profile; and said (c) includes producing one or more prints with print media from a selected one of the first and second print media trays when it is determined, with said (b) that one or both of the print media trays are enabled to process the portion of the facsimile document in accordance with the facsimile user profile; in which the first set of print media attributes includes a first print media color and the second set of print media attributes includes a second print media color, wherein said (b) includes examining both the first and second print media colors in determining whether a selected one of the plurality of document processing related subsystems is enabled to process the portion of the facsimile document in accordance with the facsimile user profile.

2. A method of printing a facsimile document, including an image data set, with a network printing system having a printing subsystem communicating with an input device by way of a network, the printing system including a memory and a plurality of document processing related subsystems, the input device transmitting the facsimile document to the printing system for producing one or more prints from the image data set, said method comprising; a) storing a facsimile user profile in the memory of the printing system, the facsimile user profile including one or more attribute sets with each attribute set, along with a corresponding set of attribute values, defining a manner in which a portion of the facsimile document is to be processed at the printing subsystem; b) reading the facsimile user profile to determine whether a selected one of the plurality of document processing related subsystems is enabled to process the portion of the facsimile document in accordance with one of the one or more attribute sets of the facsimile user profile; and c) processing the portion of the facsimile document with the selected one of the plurality of document processing related subsystems when it is determined with said (b) that the selected one of the plurality of document processing related subsystems is enabled to process the portion of the facsimile document in accordance with the facsimile user profile; in which the portion of the facsimile document comprises a banner page for the facsimile document, wherein said (c) includes processing the banner page of the facsimile document when it is determined with said (b) that the selected one of the plurality of document processing related subsystems is enabled to process the portion of the facsimile document in accordance with the facsimile user profile.

* * * * *